Nov. 1, 1927.
A. L. CARTER
1,647,342
DIAPHRAGM PRESSURE GAUGE
Filed Nov. 22, 1924
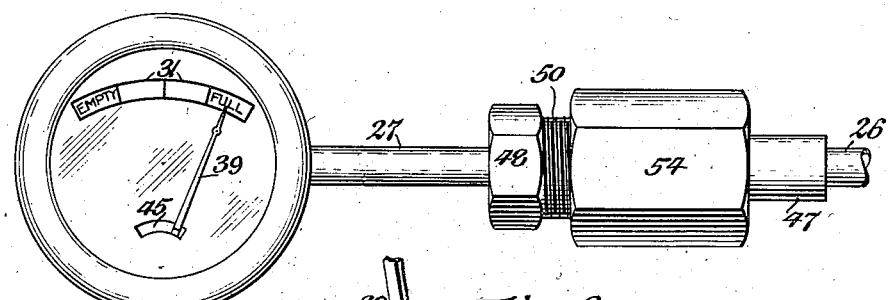
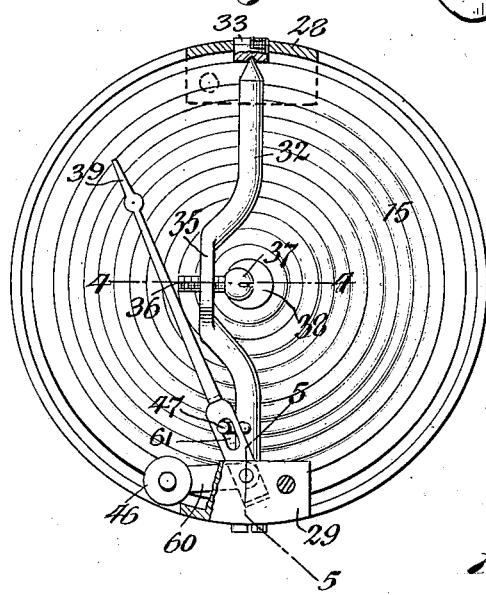
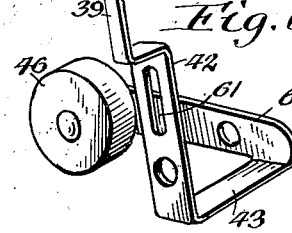
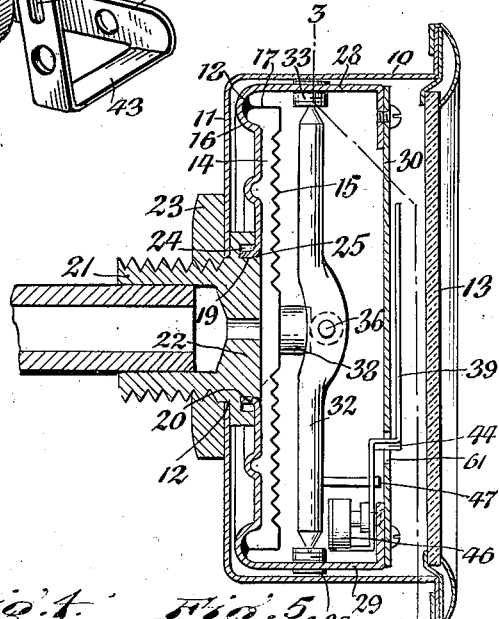

Patented Nov. 1, 1927.

1,647,342

UNITED STATES PATENT OFFICE.

ALICK L. CARTER, OF KENMORE, NEW YORK, ASSIGNOR, BY MESNE ASSIGNMENTS, TO THE GROLAN MANUFACTURING COMPANY, OF DAYTON, OHIO, A CORPORATION OF DELAWARE.

DIAPHRAGM PRESSURE GAUGE.

Application filed November 22, 1924. Serial No. 751,500.

This invention relates to a gauge for indicating variations in pressure and more particularly a gauge for indicating variations in pressure due to rising and falling of the liquid level in a tank, such as a gasolene or oil supply tank or reservoir and thus enable the user to determine when the tank should be replenished.

It is the purpose of this invention to provide a gauge of this character which is very sensitive and accurately registers slight variations in pressure, which can be readily adjusted so as to give an accurate reading when setting up the instrument, which will register steadily and not respond to sudden or rapid fluctuations in the pressure and which is very strong and durable and not liable to become broken or get out of adjustment when handled roughly or subjected to severe usage.

In the accompanying drawings:—

Figure 1, is a front elevation of a gauge and associated parts embodying my improvements.

Figure 2, is a vertical longitudinal section of the indicating portion of my improved gauge.

Figure 3, is a vertical transverse section of the same taken on line 3—3, Figure 2, with the dial and casing omitted.

Figure 4, is a fragmentary horizontal section taken on line 4—4, Figure 3, showing the parts 36, 37 and 38 in elevation.

Figure 5, is a fragmentary vertical section taken on line 5—5, Figure 3, showing the members 40 and 41 in elevation.

Figure 6, is a fragmentary perspective view of the rocker forming part of the means for transmitting motion from the pressure diaphragm to the pointer.

Figure 7, is a longitudinal section of the damper portion of the diaphragm pressure gauge with the members 26 and 27 in elevation.

Similar characters of reference indicate like parts in the several figures.

The gauge comprises generally an indicating device which registers variations in pressure and a damper which prevents the indicating mechanism from responding to sudden changes of pressure and thereby avoids vibrations of the pointer under such conditions for example, when the gauge is connected with the gasolene or oil tank of an automobile which is running over a rough or uneven road and the liquid in the tank is caused to splash about and vary its level. The indicating mechanism in its preferred form is constructed as follows:—

The enclosing casing of the working parts of the indicating mechanism comprises a cylindrical side wall 10, an upright rear wall 11 having a central opening 12, and a transparent front wall or glass pane 13 mounted on the side wall in any well known or approved manner. Within the rear part of this casing is arranged an expansion or pressure chamber having a rigid rear wall 14 and a flexible front wall or diaphragm 15 connected at its margin or outer edge with said rear wall 14, this connection being preferably formed by providing the margin of the rear wall with a rearwardly opening annular channel 16 in which a rearwardly projecting maginal flange 17 of the diaphragm is secured by soldering 18 or otherwise.

In the opening 12 of the rear casing wall is arranged a coupling nipple 21 having an enlargement or head 22 at its front end which bears against the inner or front side of the rear wall 11. This nipple is secured in said casing opening by a clamping screw nut 23 arranged on the externally screw threaded rear part of the nipple and bearing against the rear side of the wall 11. On its front side the nipple head is provided with an annular groove 24 in which is received the rearwardly projecting flange 20 of the expansion chamber, an air tight connection between these parts being obtained by soldering 25, or the like, where one end of the nipple engages in an opening in said rear wall of the expansion chamber.

The pressure is conducted from any source to the expansion chamber by a conduit which in the present instance, is composed of two sections 26, 27. When this pressure is admitted to the expansion chamber the diaphragm of the latter is deflected forwardly more or less and when this pressure is reduced the resilience of the diaphragm causes the same to spring backwardly accordingly so that the position of the diaphragm depends on the pressure within the expansion chamber.

Projecting forwardly from the upper and lower edges of the rear wall of the expansion chamber are upper and lower brackets or supports 28, 29 to which are secured a dial 30 bearing on its front side a scale 31 representing the indications of the gauge. This scale is traversed by a pointer or finger 39 arranged on the front side of the dial and adapted to be actuated in accordance with the pressure in the expansion chamber and the medium which governs the same such as the rising and falling of the level in a gasolene, oil, or liquid storage tank or reservoir.

Arranged in the space between the expansion chamber and the dial is an upright shaft 32 the axis of which, preferably extends diametrically across the center of the diaphragm and is journalled at its upper and lower ends in bearing screws 33, 34 mounted on the upper and lower brackets 28, 29. On its central part this shaft is provided with a lateral crank 35 in which is adjustably mounted the thread shank 36 of a screw, the axis of which is arranged at right angles to the axis of the shaft. The head 37 on the inner end of this screw is of spherical form and bears against the flat front side of a pressure pin 38 secured centrally to the front side of the diaphragm. The distance from the point of contact between the head 37 of the adjusting screw and the pressure pin and axis of the shaft 32 represents the length of the crank action produced on the shaft by the diaphragm as the latter expands and contracts so that the shaft is turned in accordance with the deflection and retraction of the diaphragm. By screwing the screw 36 farther into the crank or farther out of the same the length of the crank will be increased accordingly and thus permit of obtaining a correct reading of the instrument. By making the head of the screw 36 of ball shape the same will bear properly against the presser pin regardless into what position the same may be turned.

The motion of the rock shaft 32 is transmitted to the pointer 39 by means which are preferably constructed as follows:—

The numeral 40 indicates a horizontal pivot pin which is arranged lengthwise in the space between the dial and the expansion chamber and is secured at its front end to the front part of the lower bracket 29 and provided between its front and rear ends with a collar 41. Upon this pivot a U-shaped rocker or yoke is mounted to turn in a vertical plane crosswise of the dial and expansion chamber and in its preferred form this rocker comprises a front rock arm 42 pivoted on the front part of the pivot pin between the bracket 29 and the collar 41, a rear arm 60 pivoted on the rear part of said pin in rear of the collar thereon, and a crosspiece 43 connecting one end of these arms, as best shown in Figure 5. The front arm 42 is arranged in rear of the lower part of the dial and the same is connected with the pointer by a web 44 extending through a slot 45 in the dial, as shown in Figure 2. The front arm of the rocker is provided with a longitudinal upright slot 61 which receives a horizontal shifting pin 47 projecting forwardly from the lower part of the rock shaft, thereby causing the rocking movement of the latter to be transmitted to the pointer so that the same assumes a position relative to the scale or graduations on the dial corresponding to the pressure in the expansion chamber. The forward movement of the pointer from the beginning toward the end of the scale is effected by the forward pressure of the diaphragm under the action of the fluid within the expansion chamber but the backward or return movement of the same together with the rocker is effected by a return weight 46 or its equivalent secured to the end of the inner arm 60 opposite to the cross piece, as shown in Figures 2, 3, 5 and 6.

In the absence of any provision to prevent it, the pointer is liable to wiggle or vibrate rapidly forwardly and backwardly when the pressure in the expansion chamber fluctuates rapidly as would be the case when using a gauge of the character on an automobile for registering the level of the oil or gasolene, inasmuch as the running of the car over bad roads would cause a wave or splash action in the storage tank and a continuous change in the level of the liquid. To avoid this a damper has been provided which in its most perfected form is constructed as follows:—

The numerals 47ª and 48 represent two ferrules which are connected by soldering or otherwise with the opposing ends of the sections 26 and 27 of the pressure fluid conduit. One of these ferrules for example the ferrule 47, is provided with an external annular flange 49 and the other ferrule 48 is provided with an external screw thread 50 and also with an enlarged bore 51 forming a damper chamber. In this chamber is arranged a fluid damper 52 which permits air or other fluid to pass slowly back and forth through the same but prevents sudden passage of the air through the same and thus checks any tendency of the pointer to flutter but on the contrary holds the same steady and thus permits of accurate reading of the gauge. This damper filling may consist of any porous material such as rolled gauze, cheese cloth or the like and the same is packed in the damper chamber sufficiently tight to accomplish the desired results. Between the opposing ends of the two ferrules is arranged a packing ring or gasket 53 so that upon drawing the two ferrules toward each other a fluid tight joint will be formed therebetween. This is effected by means of a coupling sleeve 54 having an internal screw thread 55 at one end engaging with the external thread 50 of one ferrule and an internal flange 56 at its opposite end engaging with the external flange 49 of the other ferrule, as shown in Figure 7.

As a whole this gauge is very simple in construction, it has very few parts and these are of such a character that they can be manufactured and assembled at low cost, and when completed the gauge is very strong and durable and not liable to become disarranged even though the same be subjected to usage much rougher than is ordinarily encountered under normal conditions.

I claim as my invention:—

1. A pressure gauge, comprising a casing having an expansion or pressure chamber, a vibrating diaphragm constituting one wall of said chamber to vibrate under pressure variations, a pointer adapted to traverse a scale, and means for transmitting motion from said diaphragm to the pointer including a rock shaft adapted to be actuated by said diaphragm and provided with a shifting pin, a support, a pivot pin having its front end mounted on said support and provided between its front and rear ends with a collar, a rocker having a front rock arm, a rear rock arm, and a cross piece connecting opposite corresponding ends of said rock arms, said front arm being mounted on said pivot pin between its collar and said support and carrying said pointer and provided with a slot which receives said shifting pin, and a weight mounted on the rear arm of said rocker.

2. A pressure gauge having an expansion chamber having a rigid rear wall provided on its margin with a forwardly facing channel and on its central part with an opening and a rearwardly projecting flange around said opening, a diaphragm having its marginal part secured in said channel, a coupling nipple arranged in the opening of said rear wall and having an annular groove in which the flange of said wall is secured, a pointer, and means for transmitting motion from said diaphragm to said pointer.

3. A pressure gauge comprising an indicating mechanism adapted to be actuated by variations in fluid pressure, a conduit for conducting the pressure to said indicating mechanism, and a damper arranged in the path of said pressure medium and operating to prevent sudden fluctuations in the operation of said indicating mechanism, and comprising two ferrules secured to the opposing ends of two sections of said conduit, one of said ferrules having an external screw thread and the other an external flange and one of said ferrules having an enlarged bore forming a damper chamber, a porous or fibrous damper filling arranged in said damper chamber, and a coupling sleeve provided at one end with an internal screw thread engaging with the external thread of one ferrule and at its opposite end with an internal flange engaging with the external flange of the other ferrule.

4. A pressure gauge comprising an indicating mechanism adapted to be actuated by variations in fluid pressure, a conduit for conducting the pressure to said indicating mechanism, and a damper arranged in the path of said pressure medium and operating to prevent sudden fluctuations in the operation of said indicating mechanism, and comprising two ferrules secured to the opposing ends of two sections of said conduit, one of said ferrules having an external screw thread and the other an external flange and one of said ferrules having an enlarged bore forming a damper chamber, a fibrous damper filling arranged in said damper chamber, a coupling sleeve provided at one end with an internal screw thread engaging with the external thread of one ferrule and at its opposite end with an internal flange engaging with the external flange of the other ferrule and a packing or gasket arranged between the opposing ends of said ferrules.

5. A pressure gauge, comprising a casing including an expansion chamber having a flexible diaphragm forming one of the walls thereof, a shaft extending diametrically across the diaphragm and having its ends journaled in bearings in the wall of the casing, said shaft having a lateral crank at an intermediate part in operative engagement with the diaphragm so that deflection of the diaphragm rocks said shaft, a pin fast in an end part of the shaft, a loaded pointer pivotally mounted in the casing opposite to the end of the shaft carrying the pin, said pin having a direct engagement with the pointer close to the pivot thereof so that rocking of the shaft oscillates the pointer.

6. A pressure gauge, comprising a casing including an expansion chamber having a flexible diaphragm forming one of the walls thereof, an upright shaft extending diametrically across the diaphragm and having its ends journaled in bearings in the wall of the casing, said shaft having a lateral crank at an intermediate part in operative engagement with the diaphragm so that deflection of the diaphragm rocks the shaft, a pin fast in the lower part of the shaft, a weighted pointer pivotally mounted in the casing adjacent to the lower part of the shaft, said pointer having a direct engagement with said pin close to the pivot of the pointer so that rocking of the shaft oscillates the pointer.

ALICK L. CARTER.